Patented May 27, 1941

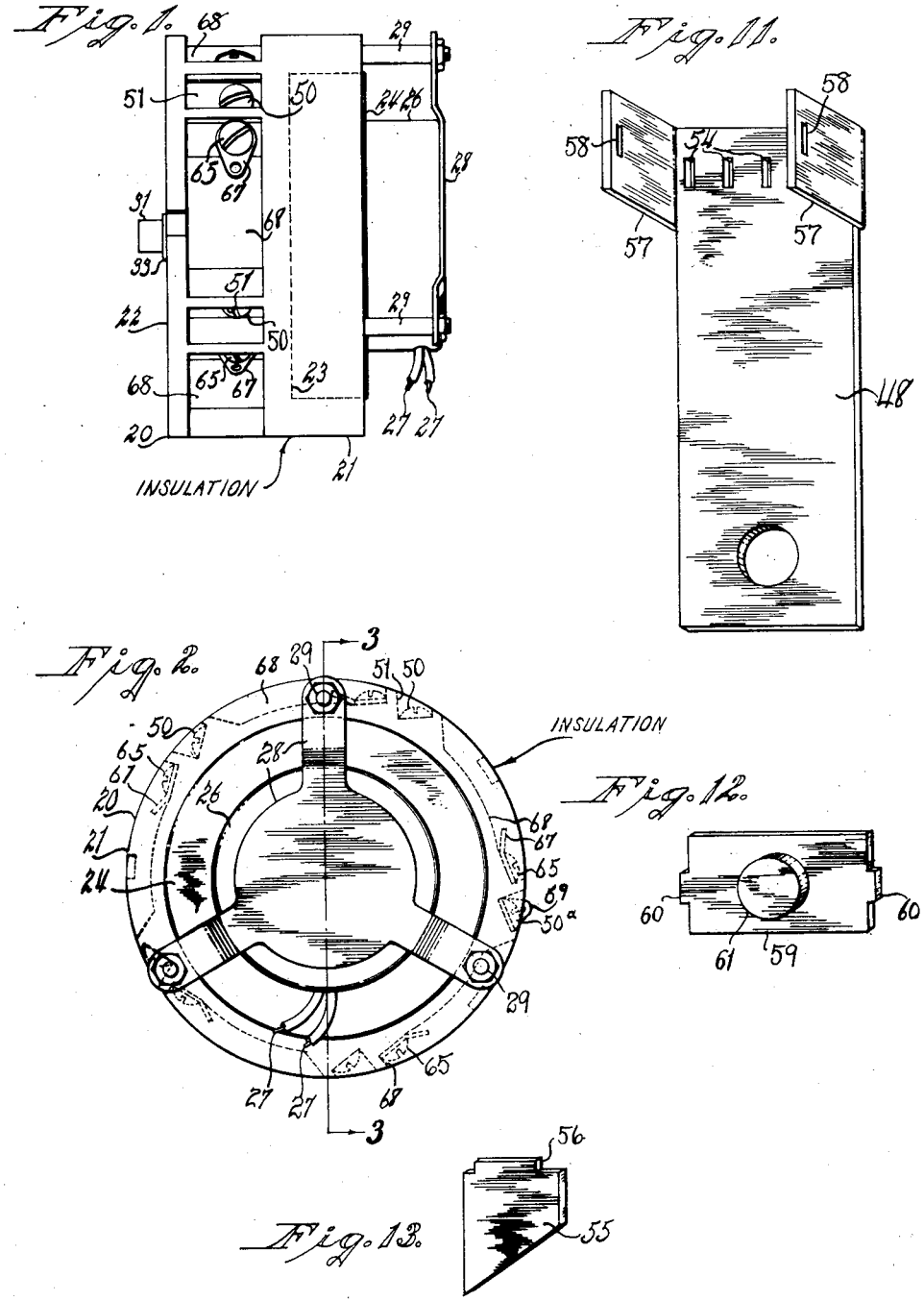

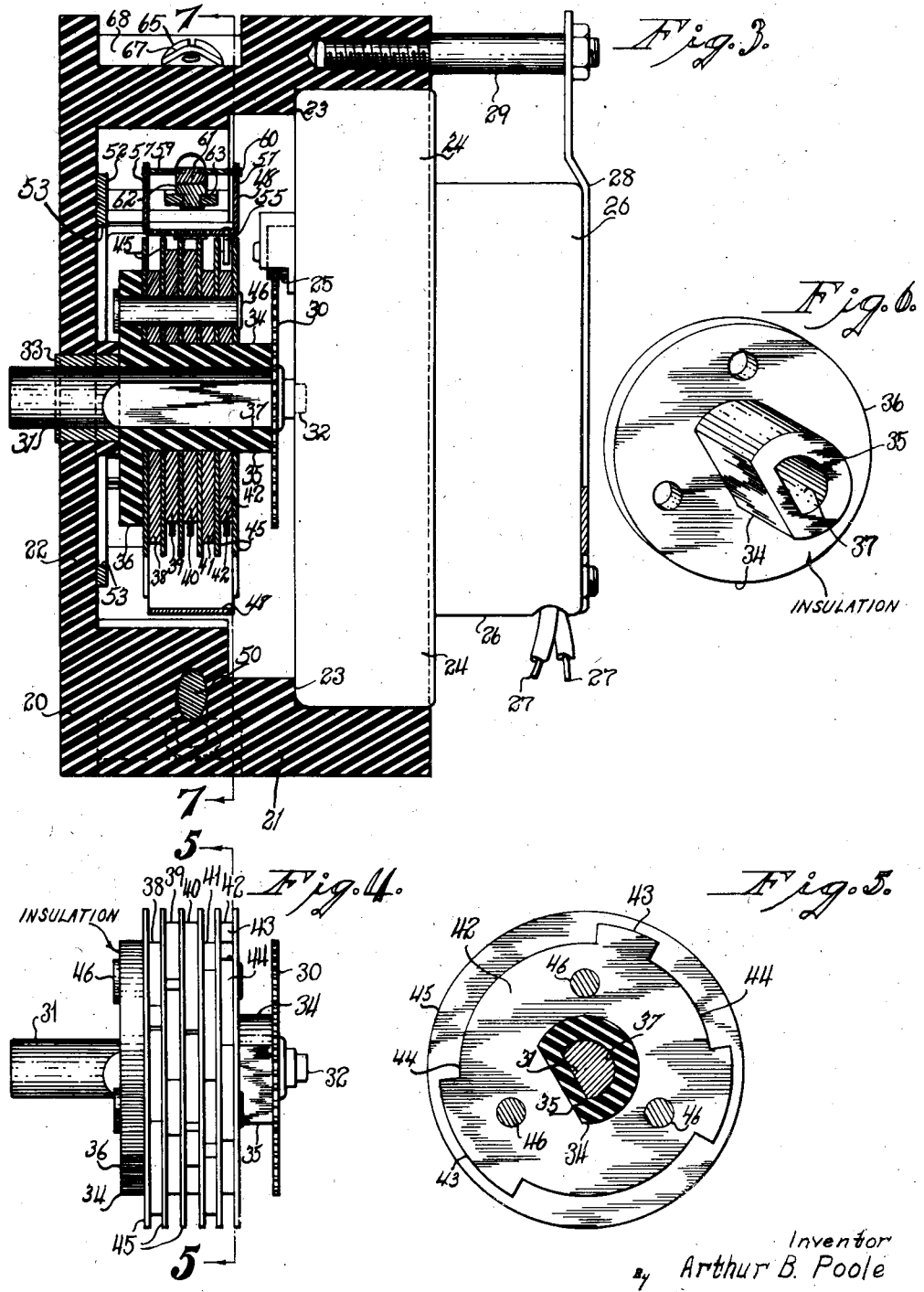

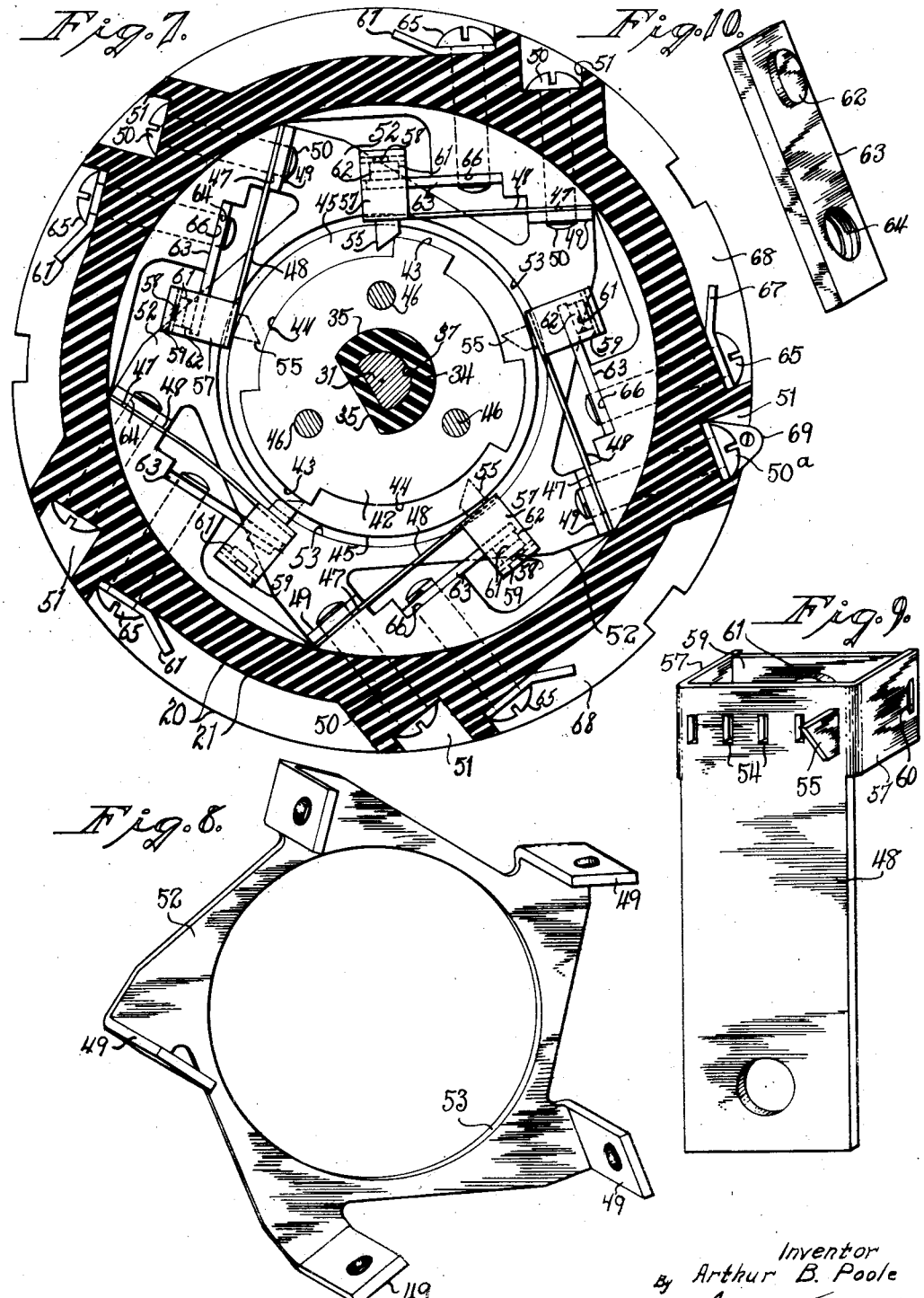

2,243,438

UNITED STATES PATENT OFFICE 2,243,438

AUTOMATIC MULTICIRCUIT CONTROL SWITCH

Arthur B. Poole, Bristol, Conn., assignor to The E. Ingraham Company, Bristol, Conn., a corporation of Connecticut Application July 3, 1939, Serial No. 282,591

6 Claims. (Cl. 200—27)

The present invention relates to improvements in automatic switches and more particularly to improvements in automatic multicircuit control-switches, i. e., automatic switches adapted to open and close a multiplicity of circuits at predetermined intervals. The automatic multicircuit control-switch of the present invention is adapted for a wide variety of uses among which may be mentioned, controlling in proper order, the washing, rinsing, etc., cycles of an automatic washing machine.

One of the objects of the present invention is to provide a simple, reliable and effective automatic switch of the character referred to, which is characterized by compactness and reliability of performance.

Another object of the present invention is to provide a superior automatic multicircuit control-switch which may be produced at a low cost for manufacture and which is capable of discharging its automatic functions over long periods of continued use without derangement of the parts.

A further object of the present invention is to provide a superior automatic switch of the character referred to, which may be conveniently assembled in a multiplicity of arrangements of its parts to render the components useful for meeting a wide variety of requirements without requiring the redesign of the structure.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a view in side elevation of one form which an automatic multicircuit control-switch embodying the present invention, may assume;

Fig. 2 is a rear face view thereof;

Fig. 3 is a view thereof in central-longitudinal section taken on the line 3—3 of Fig. 2;

Fig. 4 is a view in side elevation of the contact-actuating unit, detached;

Fig. 5 is a transverse sectional view thereof taken on the line 5—5 of Fig. 4;

Fig. 6 is a perspective view of the mounting-bushing, detached;

Fig. 7 is a transverse sectional view taken on the line 7—7 of Fig. 3;

Fig. 8 is a perspective view of the connecting-ring, detached;

Fig. 9 is a perspective view of one of the flexible contact-carrier units, detached;

Fig. 10 is a similar view of one of the rigid contact-carriers;

Fig. 11 is a perspective view of one of the flexible contact-carriers, detached;

Fig. 12 is a similar view of one of the contact-carrying plates of the contact-carrier unit, detached; and Fig. 13 is a perspective view of one of the switch-actuating shoes, detached.

The automatic multicircuit control-switch herein chosen for illustration and description for the purpose of making clear the present invention, includes a cup-shaped body-member or housing 20 which is preferably formed of Bakelite or other rugged insulating material. The said body-member includes a relatively-thick annular cylindrically-contoured flange 21 and a relatively-thin end-wall 22 integral therewith. The interior of the flange 21 of the body-member 20 is stepped to provide an annular rearwardly-facing seat 23 against which is seated a gear-train housing 24. The said gear-train housing may enclose an intermittent-drive mechanism requiring no detailed description herein other than to state that it is provided with a pinion 25 by means of which the control-switch of the present invention may be operated. By way of example, the intermittent-drive mechanism referred to as being enclosed within the gear-train housing 24, may be of the type illustrated in my co-pending application, Serial No. 216,177, filed June 27, 1938.

To the rear of the gear-train housing 24 above referred to, is a motor-housing 26 which may contain any suitable driving-motor such, for instance, as a synchronous-electric motor which is preferred. Leading outwardly from the motor-housing 26 is a pair of lead-wires 27—27 which may be connected to a suitable source of alternating current to effect the actuation of the pinion 25 and hence of the parts connected thereto, in any approved manner not requiring detailed description herein.

The motor-housing 26 is pressed forwardly against the gear-train housing 24 and the latter is pressed against the rearwardly-facing seat 23 of the body-member 20, by a three-armed clamping-plate 28. The said clamping-plate is, in turn, coupled to the flange 21 of the housing 20 by means of three posts 29 threaded into appropriate threaded bores in the rear face of the said flange 21, as is shown particularly well in Fig. 3.

The pinion 25 before referred to, meshes into and drives a gear-wheel 30 rigidly secured to the rear end of a drive-shaft 31, the rear portion of which latter is of D-shaped form in cross section for the purpose as will hereinafter appear and as is especially well shown in Figs. 5 and 7. Preferably and as shown, the extreme rear end of the drive-shaft 31 is reduced in diameter to provide a cylindrically-contoured trunnion 32 bearing within the gear-train housing 24. The forward or front portion of the drive-shaft 31 bears in an anti-friction bushing 33 (Fig. 3) mounted in the end-wall 22 of the body-member 20.

Mounted upon the drive-shaft 31 is a mounting-bushing 34 formed of Bakelite or other insulating-material and comprising a sleeve-portion 35 having an integral radially-extending annular flange 36 at its forward end. The sleeve-portion 35 of the mounting-bushing 34 is of D-shaped form both interiorly and exteriorly, as is shown particularly well in Fig. 6, so that its D-shaped interior passage 37 which extends throughout the full length of the mounting-bushing conforms to the D-shaped rear portion of the drive-shaft 31, thus effecting a driving connection between the elements 31 and 34.

Sleeved over the D-shaped sleeve-portion 35 of the mounting-bushing 34 are five (more or less) contact-actuating wheels 38, 39, 40, 41 and 42, each centrally perforated to snugly receive the said sleeve-portion 35 so as to be coupled thereto for concurrent rotation. Each of the said contact-actuating wheels is provided upon its periphery with any desired number of contact-actuating lugs 43 spaced from each other by a similar number of clearance-notches 44.

Interposed between each adjacent pair of the contact-actuating wheels 38 to 42 inclusive, as well as located against the forward face of the wheel 38 and the rear face of the wheel 42, is one of six (more or less) disk-like guide-plates 45 which are larger in diameter than the largest diameter of the said contact-actuating wheels to act as guides for contact-shoes in a manner as will hereinafter appear. Extending through the entire group of contact-actuating wheels 38 to 42 inclusive, the guide-plates 45 and the annular flange 36 of the mounting-bushing 34, are three (more or less) rivets 46 which serve to bond the parts referred to, together into a contact-actuating unit such as is shown especially well in Fig. 4 of the drawings.

Immediately to the rear of the end-wall 22, the body-member 20 is formed with an annular series of equidistant tangential inwardly-facing clamping-seats 47. Clamped against each of the clamping-seats 47 respectively is one end of one of five (more or less) corresponding flexible contact-carriers 48 formed of spring-brass or other suitable flexible electro-conductive material. Each of the said flexible contact-carriers 48 is retained in place against the adjacent one of the clamping-seats 47 by means of a tongue 49 and a tangentially-arranged clamping-screw 50 threaded at its inner end into the said tongue and having its outer head-end located in a shallow pocket 51, five of which latter are formed in the periphery of the flange 21 of the body-member 20 at equidistant points thereon.

Each tongue 49 (of which there are five) projects rearwardly from and is formed integral with a connecting-ring 52 which may be conveniently formed of sheet brass and which is seated against the inner or rear face of the end-wall 22 of the body-member 20, as is shown especially well in Fig. 3. The said connecting-ring 52 is provided with a central aperture 53 which serves to lighten the ring and at the same time provide clearance for other parts of the device.

Each of the flexible contact-carriers 48 above referred to, is formed adjacent its free end with a transverse series of five polygonal perforations 54 so spaced that one of the said perforations is in line with each of the contact-actuating wheels 38 to 42 inclusive. Installed in a chosen one of the five perforations 54 in each flexible contact-carrier 48, dependent upon which of the contact-actuating wheels 38 to 42 inclusive it may be desired to have actuate a given contact-carrier, is one of five contact-actuating shoes 55 which may be conveniently formed of sheet metal. Each shoe 55 is provided with a relatively-short shank 56 sized and shaped to snugly fit any one of the perforations 54. When the shank 56 of a given contact-actuating shoe 55 has been inserted into the desired one of the five perforations 54 in a given one of the contact-carriers 48, the said shank is swaged or burred over to rigidly unite the said shoe with the flexible contact-arm 48 referred to.

On each of the respective opposite sides of its free end, each flexible contact-carrier 48 is formed with two laterally-spaced-apart outwardly-extending arms 57—57 (see Figs. 9 and 11) each having a polygonal perforation 58 adjacent its outer end. Installed between the arms 57—57 of each of the flexible contact-carriers 48 is a contact-carrying plate 59 (Fig. 12) which is formed at each of its respective opposite ends with a polygonal tongue 60 adapted to fit into the polygonal perforation 58 in the adjacent one of the arms 57—57. Centrally riveted or otherwise secured to each of the contact-carrying plates 59 is a cylindrically-contoured movable-contact 61—so named for the reason that it moves with the outer end of the flexible contact-carrying arm 48 as the same is flexed by a given one of the contact-actuating wheels 38 to 42 inclusive.

Arranged in opposition and in axial alignment with each of the movable-contacts 61 is a cylindrically-contoured fixed contact 62 riveted or otherwise suitably secured to the outer end of a relatively-rigid plate-like contact-carrier 63 formed of brass or other suitable electro-conductive material. At its end, opposite its fixed contact 62, each contact-carrier 63 is formed with a threaded perforation 64 receiving the threaded inner end of a clamping-screw 65. Each of the five rigid contact-carriers 63 is thus clamped against one of five tangential inwardly-facing and equidistant clamping-seats 66 formed in the inner face of the flange 21 of the body-member 20, as will be seen particularly well by reference to Fig. 7.

Mounted beneath and in electrical engagement with the head of each of the five clamping-screws 65 is one of five corresponding connecting-plates 67 formed of brass or other suitable material and adapted to have soldered thereto one of five lead-wires for extension to individual relays or other electrical apparatus which it is desired to control. Each connecting-plate, as well as the head of its complemental clamping-screw 65, is located in one end of an arcuate groove-like recess 68 formed in the outer periphery of the body-member 20 and corresponding to four other recesses, one of which is provided for each of the five connecting-plates 67 and its complemental clamping-screw 65, as is shown particularly well in Fig. 7.

Beneath the head of one of the five clamping-screws 50, such, for instance, as the clamping-screw 50a, is placed a connecting-plate 69 to which may be soldered a current-supply wire from which current will be fed to the entire connecting-ring 52 and hence to each of the five movable-contacts 61 for being fed collectively to the fixed contacts 62.

The five contact-actuating shoes 55 are, respectively, in line with one of the five contact-actuating wheels 38 to 42 inclusive, and each contact-actuating shoe is projected between a pair of the guide-plates 45 to be thereby prevented from accidental lateral movement into the path of an adjacent contact-actuating wheel.

As the contact-actuating unit comprising the parts shown grouped together in Fig. 4, is turned, each of the five flexible contact-carriers 48 will be alternately flexed and released by the contact-actuating lugs and intervening clearance-notches of a given one of the contact-actuating wheels 38 to 42 inclusive, so that five distinct switch-mechanisms will be actuated to control five separate electrical devices if so desired.

By mounting both the movable and fixed contacts upon an insulated body-member or its equivalent, it is possible to employ highly-desirable metal contact-actuating wheels and also metal guide-plates, without resorting to complex arrangements of multitudinous parts.

By providing a plurality of flexible contact-carriers such as 48, each having a plurality of perforations adapted to receive a contact-actuating shoe, automatic switches of the present invention may be built at a low cost for manufacture and may be adapted for a wide range of uses, since, for instance, should it be desired to cause a given flexible contact-carrier to be actuated by a different contact-actuating wheel from that shown, all that is required is to install a contact-shoe 55 in the appropriate one of the five (more or less) perforations 54 provided in each of the said contact-carriers.

In the above manner and without employing additional parts, switch-mechanisms of the present invention may be assembled to meet a variety of requirements from the same group of parts as will serve to meet another set of requirements.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An automatic multicircuit control-switch, including in combination: a hollow body-member having a first annular series of tangential seats therein and a second annular series of tangential seats also located therein; a series of movable contact-carriers respectively associated with one of the first series of annular seats in the said body-member; a movable-contact carried by each of the said movable contact-carriers; a second series of contact-carriers respectively associated with one of the second annular series of tangential seats in the said body-member; a second series of contacts respectively carried by the said second series of contact-carriers; rotary-means for actuating the said movable contact-carriers; a plurality of fastening-members extending from the interior to the outer periphery of the said hollow body-member and respectively holding one of the aforesaid series of contact-carriers in place against their respective tangential seats in the said body-member, each of the said fastening-members being in electrical communication with the contact-carrier which it holds in place and providing an electrical path therefor independently of the other of said fastening-members; and means for electrically interconnecting the other of said series of contact-carriers.

2. An automatic multicircuit control-switch, including in combination: a hollow body-member having a first annular series of tangential seats therein and a second annular series of tangential seats also located therein; a series of movable contact-carriers respectively associated with one of the said first series of annular seats in the said body-member; a movable-contact carried by each of the said movable contact-carriers; a second series of contact-carriers respectively associated with one of the second annular series of tangential seats in the said body-member; a second series of contacts respectively carried by the said second series of contact-carriers; rotary-means for actuating the said movable contact-carriers; a plurality of fastening-members extending from the interior to the outer periphery of the said hollow body-member and respectively holding one of the aforesaid series of contact-carriers in place against their respective tangential seats in the said body-member, each of the said fastening-members being in electrical communication with the contact-carrier which it holds in place and providing an electrical path therefor independently of the other of said fastening-members; and a connecting-ring mounted within the said hollow body-member and having portions engaged with each of the other of the said series of contacts to electrically interconnect the same.

3. An automatic multicircuit control-switch, including in combination: a hollow body-member having a first annular series of tangential seats therein and a second annular series of tangential seats also located therein; a series of movable contact-carriers respectively associated with one of the said first series of annular seats in the said body-member; a movable-contact carried by each of the said movable contact-carriers; a second series of contact-carriers respectively associated with one of the second annular series of tangential seats in the said body-member; a second series of contacts respectively carried by the said second series of contact-carriers; rotary-means for actuating the said movable contact-carriers; a plurality of fastening-members extending from the interior to the outer periphey of the said hollow body-member and respectively holding one of the aforesaid series of contact-carriers in place against their respective tangential seats in the said body-member, each of the said fastening-members being in electrical communication with the contact-carrier which it holds in place and providing an electrical path therefor independently of the other of said fastening-members; a connecting-ring having a plurality of laterally-offsetting tongues respectively electrically engaged with each of the other of the said series of contact-carriers for electrically interconnecting the same; and a conducting-member extending from one of the tongues of the said connecting-ring outwardly through the said body-member for electrically connecting the said connecting-ring to an external source of electric current.

4. An automatic multicircuit control-switch, including in combination: a rotary mounting-member; a plurality of rotary contact-actuating members carried by the said rotary mounting-member and axially displaced with respect to each other thereon; a body-member; a plurality of movable contact-carriers carried by the said body-member and arranged in annular sequence around a common center therein and in substantially a common plane perpendicular to the axis of the said rotary mounting-member, each of the said movable contact-carriers being provided with a series of sockets sequentially in registration with the said plurality of rotary contact-actuating members; and a plurality of interchangeable contact-actuating shoes, one of which is installed in one of the series of sockets in a given one of the said plurality of contact-carriers for engagement by the particular contact-actuating member aligned therewith.

5. An automatic multicircuit control-switch, including in combination: a rotary mounting-member; a plurality of rotary contact-actuating members carried by the said rotary mounting-member and axially displaced with respect to each other therein; a body-member; a plurality of movable contact-carriers carried by the said body-member and arranged in annular sequence around a common center therein and in substantially a common plane perpendicular to the axis of the said rotary mounting-member, each of the said movable contact-carriers being provided with a series of sockets sequentially in registration with each of the said plurality of rotary contact-actuating members; a plurality of interchangeable contact-actuating shoes, one of which is installed in one of the series of sockets in a given one of the said plurality of contact-carriers; a contact carried by each of the said flexible contact-carriers at a point displaced inwardly with respect to the portion of the flexible contact-carrier which receives the said contact-actuating shoe; and a second series of contact-carriers respectively extending into a position in between the portion of a given flexible contact-carrier which mounts one of the said contact-actuating shoes and the said contact carried by the said flexible contact-carrier.

6. An automatic multicircuit control-switch, including in combination: a body-member; a plurality of movable-contacts carried by the said body-member and arranged in annular sequence around a common center; a second series of contacts also carried by the said body-member and positioned to be respectively engaged by one of the said plurality of movable-contacts and otherwise insulated therefrom; a rotary mounting-member formed of insulating material; a plurality of rotary contact-actuating members formed of electro-conductive material and carried by the said insulating rotary mounting-member and respectively actuating one of the said plurality of movable-contacts; a series of rotary guard-members mounted on the said mounting-member and so arranged thereon that one guard-member is located adjacent each of the respective opposite sides of each of said rotary contact-actuating members; and actuating-means for the said electro-conductive contact-actuating members and insulated therefrom by the said rotary mounting-member.

ARTHUR B. POOLE.